June 16, 1942.   B. BURNS   2,286,461
CLUTCH FOR MOTOR VEHICLES
Filed April 7, 1941   2 Sheets-Sheet 1

INVENTOR
BRUCE BURNS
BY
HARRIS, KIECH, FOSTER & HARRIS

ATTORNEYS

June 16, 1942.  B. BURNS  2,286,461

CLUTCH FOR MOTOR VEHICLES

Filed April 7, 1941  2 Sheets-Sheet 2

INVENTOR
BRUCE BURNS
BY
HARRIS, KIECH, FOSTER & HARRIS
FOR THE FIRM
ATTORNEYS

Patented June 16, 1942

2,286,461

UNITED STATES PATENT OFFICE 2,286,461

CLUTCH FOR MOTOR VEHICLES

Bruce Burns, Santa Monica, Calif., assignor to Salsbury Corporation, Los Angeles, Calif., a corporation of California Application April 7, 1941, Serial No. 387,222

6 Claims. (Cl. 192—105)

My invention relates to motor vehicles and is particularly applicable to small motor vehicles driven by an internal combustion engine. Internal combustion engines are commonly used to operate motor vehicles. Such engines must ordinarily be started by some means outside the engine, and in motor vehicles the engine is usually started by an electric motor driven by a storage battery. Prior to the adoption of such motors, engines were started by a hand crank.

Small light vehicles may be pushed forward by the rider before he mounts them and it is possible to use this forward movement of the vehicle to start the engine.

It is an object of my invention to provide an entirely automatic clutch which may be used for this purpose. This clutch forms a part of the mechanism through which power is transmitted between the engine and the wheel.

It is highly desirable after the engine is started that the engine be permitted to rotate at a low speed, hereinafter called "idling speed," without transmitting power to the driving wheel so that the operator can stop the vehicle without stopping the engine, and it is an object of my invention to provide a clutch through which the rotation of the wheel caused by pushing the vehicle forward will start the engine, but through which the engine cannot drive the wheel, so that after the engine is started it can rotate at idling speed with the vehicle stationary.

It is a further object of the invention to provide means in the clutch through which the engine will drive the wheel if the engine is caused to rotate above such idling speed. This, of course, will occur whenever the engine throttle is opened.

It is a further object of my invention to provide means, dependent solely on the speed of the engine and inoperative except when the engine is rotating above idling speed, through which the engine may drive the wheel.

Further objects and advantages will be made evident hereinafter.

Referring to the drawings, which are for illustrative purposes only:

Figure 1:
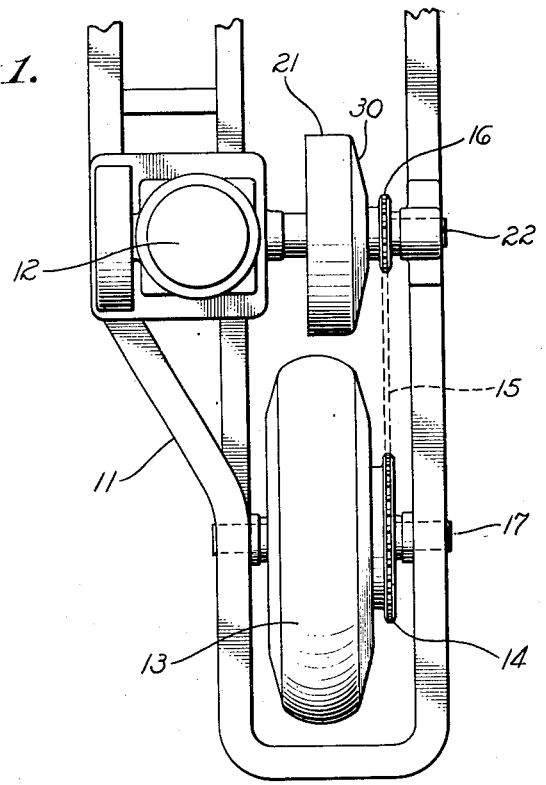
Fig. 1 is a plan view showing how the invention is used in a light vehicle.

The invention may be applied to a light motor vehicle in the manner shown very diagrammatically in Fig. 1. In this figure, 11 is the frame of a vehicle, the frame having an internal combustion engine 12 mounted thereon. A driving wheel 13 has its shaft 17 journalled on the frame on each side of the wheel. The wheel 13 has a driven sprocket 14 driven by a chain 15 from a driving sprocket 16 which is driven through a clutch 21. The construction of the clutch is shown in Figs. 2, 3, and 4.

In the construction shown, the clutch 21 is carried wholly on the shaft 22 of the engine. The engine-driven parts shown in Fig. 2 and Fig. 3 are driven by and always rotate with the shaft 22, whereas the parts shown in Fig. 4 may be stationary when the shaft 22 is rotating. It is the object of the invention to frictionally couple the parts shown in Fig. 2 to the parts shown in Fig. 4, as will be explained.

Figure 2:
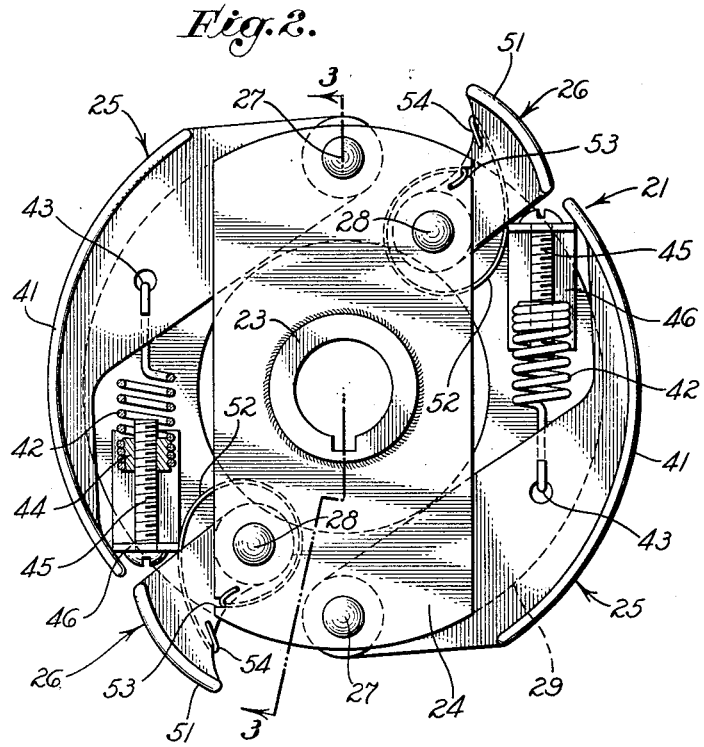
Fig. 2 is an elevation showing the engine-driven parts.
Figure 3:
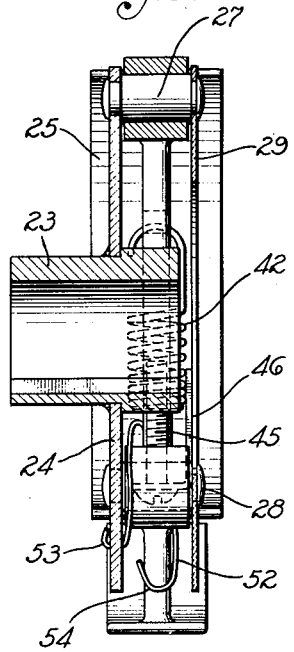
Fig. 3 is a section on a plane represented by the line 3—3 of Fig. 2.

Referring to the engine-driven parts shown in Fig. 2, I provide a hub 23 which is keyed to the engine shaft 22. Rigidly secured to the hub 23 and in effect an integral part thereof is a drive plate 24. The drive plate 24 drives two running shoes 25 and two starting shoes 26. The two starting shoes are exactly alike and the two running shoes are exactly alike. Each running shoe 25 is pivoted on a running shoe pin 27 and each starting shoe 26 is pivoted on a starting shoe pin 28. A stiffening plate 29 also connects the four pins 27 and 28.

Figure 4:
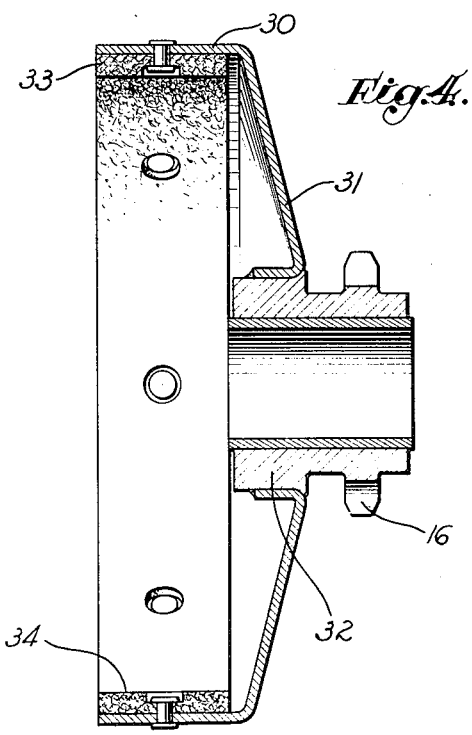
Fig. 4 is a section on the same plane through the wheel-driving parts.

A clutch drum 30 shown in Fig. 4 is carried by a flange 31 which is welded to a hub 32 which is free to rotate on the shaft 22. The hub 32 also carries the sprocket 16. The inner cylindrical surface of the drum 30 provides a frictional surface, and to improve its frictional properties it may be lined with brake lining material 33, in which case the inner surface 34 of the brake lining material 33 forms a cylindrical friction surface which is engaged by the running clutch shoe 25 and the starting clutch shoe 26.

Each running clutch shoe has a friction surface 41 of about the same radius as the surface 34, the surface 41 being so situated that it frictionally engages the surface 34 when the running clutch shoe 25 is in its outer or expanded position. The shoes 25 are, however, each held in an inner or retracted position by a tension spring 42 which is attached at 43 to the shoe 25 at one end, the other end of the spring 42 being attached to a nut 44 the position of which may be adjusted on a screw 45 carried by a bracket 46 fixed to the plate 24. The purpose of the members 44, 45, and 46 is to regulate the tension of the spring 42 and thus regulate the force tending to hold the shoe 25 in its inner or retracted position.

The weight of the shoe 25 is, however, so distributed with relation to the pin 27 that the centrifugal force, generated by this weight as the parts shown in Fig. 2 rotate with the engine shaft 22, tends to force the surface 41 against the surface 34. The rotative speed at which such actual contact occurs is regulated by the tension of the spring 42. In practice the parts are so proportioned and the tension of the spring 42 is so adjusted that frictional contact between the surfaces 41 and 34 is established at a rotative engine speed a little above idling speed. This speed may be called running-clutch-engaging speed. At all speeds above running-clutch-engaging speed the running clutch shoes 25 are frictionally locked to the drum 30. At engine speeds below said engaging speed, the running clutch shoes 25 are held in their inner or inoperative position.

Figure 5:
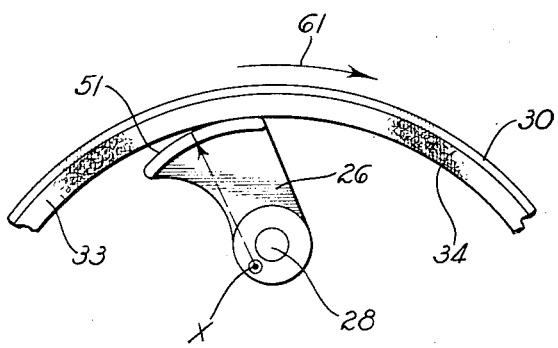
Fig. 5 is a diagram showing the method of operation of the starting clutch shoe.

Each of the starting clutch shoes 26 has a friction surface 51 which is held in light contact at all times with the surface 34 by a spring 52, one end of which is secured in a hole 53 in the plate 24 and the other end 54 of which engages the shoe 26. The spring 52 tends to rotate the shoe 26 about the pin 28 in a clockwise direction as viewed in Fig. 2. Due to its eccentricity the surface 51 will drive the surface 34 only in one direction. This will be better understood from an inspection of Fig. 5. The shoe 26 is pivoted on the pin 28 but the surface 51 is not concentric with the axis of the pin 28 but about a point X. If, now, the drum rotates in the direction of the arrow 61 with the pin 28 stationary, the shoe 26 rotates in a clockwise direction about the pin 28 and the surfaces 51 and 34 are wedged together, thus greatly increasing their frictional effect. This is what happens when the engine and the pin 28 are at rest and the drum 30 is rotated by pushing the vehicle forward. The surface 51 is jammed against the surface 34 and the pin 28 is forced to rotate with the drum 30, thus starting the engine. If, however, after the engine has started and the parts shown in Fig. 2 are rotating with the engine, the vehicle stops and hence the drum 30 stops, and the starting shoe clutch releases. In effect it acts exactly as if the pin 28 were stationary and the drum 30 were rotated in the opposite direction from that shown by the arrow 61. An inspection of Fig. 5 will show that when this happens the shoe 26 rotates in a counterclockwise direction, thus decreasing the pressure between the surfaces. This presure can never be entirely removed due to the action of the spring 52, but the slight frictional drag produced by this spring does not produce a substantial driving force for the vehicle. The spring 52 is desirable, however, to insure that wedging action will occur when the clutch is called upon to start the engine.

The operation of my invention when used in a vehicle is as follows:

The vehicle is pushed forward by the rider and the starting shoes 26 wedge as described and drive the motor starting it. As soon as the motor starts the starting shoes 26 release and the engine will continue to run, the throttle being set at idling speed. At this speed with the vehicle stationary, both the running and starting shoes are inoperative. The rider now mounts the vehicle and opens the throttle of his engine. As soon as the engine rotates above the running-clutch-shoe-engaging speed, the running clutch shoes 25 come into action and the engine 12 drives the wheel 13. If the vehicle slows down, the running clutch shoes disengage at a speed somewhat below said engaging speed. Due, however, to the action of the starting clutch shoes as long as the vehicle is in motion the engine cannot stop, for as the drum 30 is turning the starting clutch shoes 26 will engage if the pins 28 are rotating about the axis of the shaft 22 at a slower rate than the drum 30. This feature is important, as it assists the rider in stopping the vehicle without stopping or "killing" his engine.

I claim as my invention:

1. In a clutch, the combination of: a clutch drum having a cylindrical inner friction surface; a member rotating about the axis of said surface; a running shoe pivoted on said member, said shoe having a friction surface adapted to conform to the friction surface of said drum and having a weight distribution, in relation to its pivot, such that the friction surface of said shoe is forced outwardly by centrifugal force toward said friction surface of said drum when said member is rotated; spring means between said member and said shoe tending to resist said centrifugal force; a starting shoe pivoted on said member, said shoe having a friction surface so placed as to engage the friction surface of said drum, the friction surface of said starting shoe being eccentric with relation to the pivot of said starting shoe, so that the friction surface of said drum and the friction surface of said starting shoe are forced together by wedging action when said clutch delivers power through said starting shoe in one direction and are forced apart by a reversed action when said clutch attempts to deliver power in an opposite direction; and spring means acting between said member and said starting shoe and tending to act on said starting shoe in such a manner as to hold the friction surface of said starting shoe in contact with the friction surface of said drum.

2. In a clutch, the combination of: a clutch drum having an inner cylindrical friction surface; a hub rotating about the axis of said drum; a drive plate member rigidly secured to said hub and projecting inside said drum; a running shoe pin carried by said drive plate; a running shoe pivoted on said running shoe pin and having a running shoe friction surface so shaped and placed as to engage said clutch drum friction surface and having its weight so distributed that centrifugal force tends to cause it to so engage as said hub is rotated; a spring acting between said plate and said running shoe and tending to resist said centrifugal force; a starting shoe pin carried on said plate; a starting shoe pivoted on said starting shoe pin and having a friction surface adapted to engage said friction surface on said drum, said friction surface on said starting shoe being eccentric to the axis of said starting shoe pin so that the pressure between the friction surface of said starting shoe and the friction surface of said clutch drum is increased if said starting shoe is rotated about said starting shoe pin with said surfaces in contact; and a spring acting between said starting shoe and said plate tending to so rotate said starting shoe.

3. In a clutch, the combination of: a clutch drum having an inner cylindrical friction surface; a hub rotating about the axis of said drum; a drive plate member rigidly secured to said hub and projecting inside said drum; a running shoe pin carried by said drive plate; a running shoe pivoted on said running shoe pin and having a running shoe friction surface so shaped and placed as to engage said clutch drum friction surface and having its weight so distributed that centrifugal force tends to cause it to so engage as said hub is rotated; a spring acting between said plate and said running shoe and tending to resist said centrifugal force; a starting shoe pin carried on said plate; a bracing plate parallel to said drive plate secured to and aligning said running shoe pin and said starting shoe pin; a starting shoe pivoted on said starting shoe pin and having a friction surface adapted to engage said friction surface on said drum, said friction surface on said starting shoe being eccentric to the axis of said starting shoe pin so that the pressure between the friction surface of said starting shoe and the friction surface of said clutch drum is increased if said starting shoe is rotated about said starting shoe pin with said surfaces in contact; and a spring acting between said starting shoe and said plate tending to so rotate said starting shoe.

4. In a clutch, the combination of: a clutch drum having a cylindrical inner friction surface; a member rotating about the axis of said surface; a running shoe pivoted on said member, said shoe having a friction surface adapted to conform to the friction surface of said drum; means for causing said running shoe to cause the friction surface on said shoe to engage the friction surface on said drum; a starting shoe pivoted on said member, said shoe having a friction surface so placed as to engage the friction surface of said drum, the friction surface of said starting shoe being eccentric with relation to the pivot of said starting shoe, so that the friction surface of said drum and the friction surface of said starting shoe are forced together by wedging action when said clutch delivers power through said starting shoe in one direction and are forced apart by a reversed action when said clutch attempts to deliver power in an opposite direction; and spring means acting between said member and said starting shoe and tending to act on said starting shoe in such a manner as to hold the friction surface of said starting shoe in contact with the friction surface of said drum.

5. In a clutch, the combination of: a clutch drum having an inner cylindrical friction surface; a hub rotating about the axis of said drum; a drive plate member rigidly secured to said hub and projecting inside said drum; a running shoe pin carried by said drive plate; a running shoe pivoted on said running shoe pin and having a runnnig shoe friction surface so shaped and placed as to engage said clutch drum friction surface; means for causing said running shoe to cause the friction surface on said shoe to engage the friction surface on said drum; a starting shoe pin carried on said plate; a starting shoe pivoted on said starting shoe pin and having a friction surface adapted to engage said friction surface on said drum, said friction surface on said starting shoe being eccentric to the axis of said starting shoe pin so that the pressure between the friction surface of said starting shoe and the friction surface of said clutch drum is increased if said starting shoe is rotated about said starting shoe pin with said surfaces in contact; and a spring acting between said starting shoe and said plate tending to so rotate said starting shoe.

6. In a clutch, the combination of: a clutch drum having an inner cylindrical friction surface; a hub rotating about the axis of said drum; a drive plate member rigidly secured to said hub and projecting inside said drum; a running shoe pin carried by said drive plate; a running shoe pivoted on said running shoe pin and having a running shoe friction surface so shaped and placed as to engage said clutch drum friction surface; means for causing said running shoe to cause the friction surface on said shoe to engage the friction surface on said drum; a starting shoe pin carried on said plate; a bracing plate parallel to said drive plate secured to and aligning said running shoe pin and said starting shoe pin; a starting shoe pivoted on said starting shoe pin and having a friction surface adapted to engage said friction surface on said drum, said friction surface on said starting shoe being eccentric to the axis of said starting shoe pin so that the pressure between the friction surface of said starting shoe and the friction surface of said clutch drum is increased if said starting shoe is rotated about said starting shoe pin with said surfaces in contact; and a spring acting between said starting shoe and said plate tending to so rotate said starting shoe.

BRUCE BURNS.